US009951264B2

(12) United States Patent
Penny et al.

(10) Patent No.: US 9,951,264 B2
(45) Date of Patent: Apr. 24, 2018

(54) SURFACTANT FORMULATIONS FOR FOAM FLOODING

(71) Applicant: Flotek Chemistry, LLC, Marlow, OK (US)

(72) Inventors: Glenn S. Penny, Houston, TX (US); Yu Bian, Katy, TX (US); John T. Pursley, The Woodlands, TX (US)

(73) Assignee: Flotek Chemistry, LLC, Marlow, OK (US)

( * ) Notice: Subject to any disclaimer, the term of this patent is extended or adjusted under 35 U.S.C. 154(b) by 0 days.

(21) Appl. No.: 15/380,881

(22) Filed: Dec. 15, 2016

(65) Prior Publication Data
US 2017/0190953 A1 Jul. 6, 2017

Related U.S. Application Data

(62) Division of application No. 13/863,205, filed on Apr. 15, 2013, now abandoned.

(60) Provisional application No. 61/733,872, filed on Dec. 5, 2012, provisional application No. 61/624,337, filed on Apr. 15, 2012.

(51) Int. Cl.
*C09K 8/584* (2006.01)
*C09K 8/594* (2006.01)
*E21B 43/16* (2006.01)

(52) U.S. Cl.
CPC ............ *C09K 8/584* (2013.01); *C09K 8/594* (2013.01); *E21B 43/168* (2013.01); *C09K 2208/10* (2013.01)

(58) Field of Classification Search
CPC .... C09K 2208/10; C09K 8/584; C09K 8/594; E21B 43/168
See application file for complete search history.

(56) References Cited

U.S. PATENT DOCUMENTS

| 3,047,062 A | 7/1962 | Meadors |
| 3,060,210 A | 10/1962 | De Groote et al. |
| 3,347,789 A | 10/1967 | Dickson et al. |
| 3,368,624 A | 2/1968 | Heuer et al. |

(Continued)

FOREIGN PATENT DOCUMENTS

| CN | 102127414 | 7/2011 |
| CN | 102277143 | 12/2011 |

(Continued)

OTHER PUBLICATIONS

Extended European Search Report for Application No. EP 13778466.6 dated Sep. 11, 2015.

(Continued)

*Primary Examiner* — Alicia Bland
(74) *Attorney, Agent, or Firm* — Wolf, Greenfield & Sacks, P.C.

(57) ABSTRACT

A foam generating surfactant formulation includes a betaine, an alpha-olefin sulfonate and a nanofluid. The betaine is preferably a cocamidopropyl betaine or laurel betaine. The alpha-olefin sulfonate is preferably an anionic surfactant having between 8 and 18 carbon atoms per molecule. The nanofluid is preferably an oil-in-water nanofluid that includes an emulsifying surfactant, a solvent, a co-solvent and water. The addition of the nanofluid increases the thermal stability and salt resistance of the foam generating surfactant.

17 Claims, 1 Drawing Sheet

(56) References Cited

U.S. PATENT DOCUMENTS

| | | |
|---|---|---|
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,206,809 A | 6/1980 | Jones |
| 4,276,935 A | 7/1981 | Hessert et al. |
| 4,360,061 A | 11/1982 | Canter et al. |
| 4,414,128 A | 11/1983 | Goffinet |
| 4,511,488 A | 4/1985 | Matta |
| 4,650,000 A | 3/1987 | Andreasson et al. |
| 5,008,026 A | 4/1991 | Gardner et al. |
| 5,034,140 A | 7/1991 | Gardner et al. |
| 5,074,358 A * | 12/1991 | Rendall .................. C09K 8/594 166/268 |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,358,046 A * | 10/1994 | Sydansk .................. B09C 1/00 166/270.1 |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | VonKrosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,939,832 B2 | 9/2005 | Collins |
| 6,984,610 B2 | 1/2006 | VonKrosigk et al. |
| 7,021,378 B2 | 4/2006 | Prokop |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |

(56) References Cited

U.S. PATENT DOCUMENTS

| | | | |
|---|---|---|---|
| 8,592,350 B2 | 11/2013 | van Zanten et al. |
| 8,684,079 B2 | 4/2014 | Wattenbarger et al. |
| 8,778,850 B2 | 7/2014 | Andrecola |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0166472 A1 | 9/2003 | Pursley et al. |
| 2003/0232095 A1 | 12/2003 | Garti et al. |
| 2004/0068050 A1 | 4/2004 | Miller et al. |
| 2005/0039919 A1 | 2/2005 | Harris et al. |
| 2006/0014648 A1 | 1/2006 | Milson et al. |
| 2006/0211593 A1 | 9/2006 | Smith |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0151943 A1 | 6/2009 | Nguyen et al. |
| 2009/0159288 A1 | 6/2009 | Horvath Szabo et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2010/0022421 A1 | 1/2010 | Gutierrez et al. |
| 2010/0173805 A1 | 7/2010 | Pomerleau |
| 2010/0209991 A1 | 8/2010 | Hecht et al. |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0275546 A1* | 11/2011 | Zamudio Rivera . B01F 17/0042 507/213 |
| 2011/0290491 A1 | 12/2011 | Gupta et al. |
| 2012/0004146 A1 | 1/2012 | Van Zanten |
| 2012/0015852 A1 | 1/2012 | Quintero et al. |
| 2012/0035085 A1 | 2/2012 | Parnell et al. |
| 2012/0066839 A1 | 3/2012 | Man et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2014/0110344 A1 | 4/2014 | Hoag et al. |
| 2014/0202700 A1 | 7/2014 | Blair |
| 2014/0299325 A1 | 10/2014 | Zelenev et al. |
| 2014/0332212 A1 | 11/2014 | Ayers et al. |

FOREIGN PATENT DOCUMENTS

| | | |
|---|---|---|
| CN | 103614128 | 3/2014 |
| CN | 103642477 | 3/2014 |
| EP | 1 051 237 B1 | 11/2003 |
| EP | 1 378 554 A1 | 1/2004 |
| EP | 2 374 530 A1 | 10/2011 |
| EP | 1 786 879 B1 | 2/2012 |
| EP | 2 195 400 B1 | 8/2012 |
| EP | 1 880 081 B1 | 3/2013 |
| WO | WO 92/14907 A1 | 9/1992 |
| WO | WO 1999/049182 | 9/1999 |
| WO | WO 2007/011475 | 1/2007 |
| WO | WO 2012/158645 | 11/2012 |

OTHER PUBLICATIONS

International Search Report and Written Opinion for Application No. PCT/US2013/036650 dated Sep. 6, 2013.
[No Author Listed], The HLB system: a time-saving guide to emulsifier selection. ICI Americas Inc. 1976. 22 pages.
ADM, Evolution Chemicals E5789-117 Description. Jun. 2014.
Brost et al., Surfactants assist water-in-oil monitoring by fluroescence. World Oil. Oct. 2008;229(10).
Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.
Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.
Haw, The HLB system: a time saving guide to surfactant selection. Presentation to the Midwest chapter of the society of cosmetic chemists. Uniqema. Mar. 9, 2004. 39 slides.
Howard et al., Comparison of flowback aids: understanding their capillary pressure and wetting properties. SPE Production & Operations. Aug. 2010;:376-87.
Kunieda et al. Evaluation of hydrophile-lipophile balance (HLB) of nonionic surfactants. J Colloid and Interface Sci. Sep. 1985;107(1):107-21.
Yang et al., Optimizing nanoemulsions as fluid flowback additives in enhancing tight gas production. J Petroleum Sci Eng. 2014;121:122-5.
Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.
Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.
Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

* cited by examiner

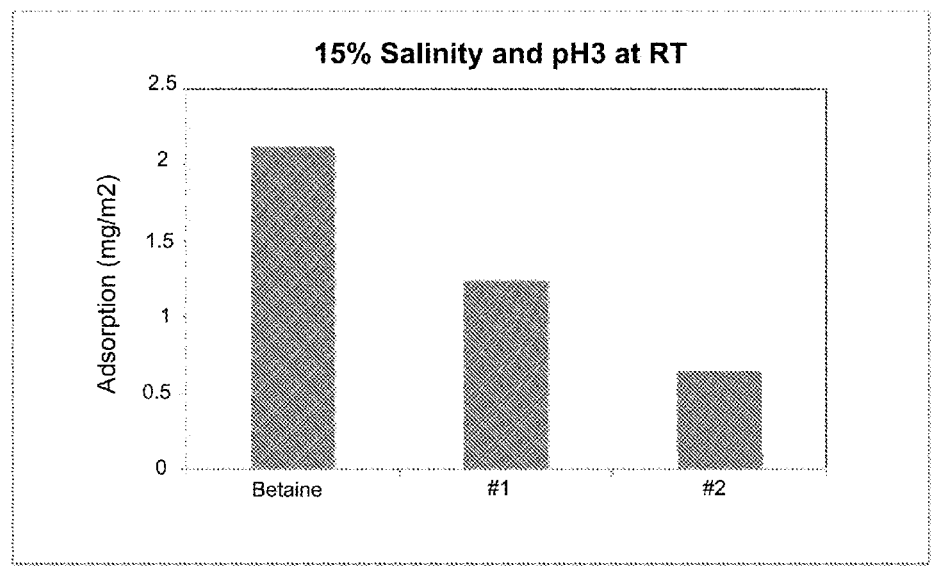

SURFACTANT FORMULATIONS FOR FOAM FLOODING

RELATED APPLICATIONS

The present application is a divisional of U.S. patent application Ser. No. 13/863,205 filed Apr. 15, 2013 entitled "Surfactant Formulations for Foam Flooding," which claims the benefit of U.S. Provisional Patent Application Ser. No. 61/624,337 filed Apr. 15, 2012 entitled "Microemulsion for Carbon Dioxide Foam Flooding," and U.S. Provisional Patent Application Ser. No. 61/733,872 filed Dec. 5, 2012 entitled "Microemulsion for Foam Flooding," the disclosures of which are herein incorporated by reference.

FIELD OF THE INVENTION

The present invention generally relates to the production of petroleum and more particularly to compositions and processes for improving the recovery of petroleum from a subterranean geological formation.

BACKGROUND OF THE INVENTION

For many years, petroleum has been recovered from subterranean reservoirs through the use of drilled wells and production equipment. During the production of desirable hydrocarbons, such as crude oil and natural gas, a number of other naturally occurring substances may also be encountered within the subterranean environment.

Although supercritical carbon dioxide ($CO_2$) flooding is a widely used method in tertiary oil recovery, the method presents many challenges, such as inefficient gas utilization, poor sweep efficiency and low oil recovery due to viscous fingering and gravity segregation. One recent development is the application of $CO_2$ foam in order to reduce the $CO_2$ mobility, especially in high permeability zones of the reservoir. In the past, $CO_2$ foam has been produced using surfactant mixtures prepared through the combination of betaines and alpha-olefin sulfonates (AOS). The efficiency of these prior art $CO_2$ foam efforts often decreases sharply during flooding as a result of contact with crude oil, retention of surfactants on the geologic formation, high salinity in formation water, a lack of reservoir pressure necessary to keep the $CO_2$ as a supercritical fluid and high reservoir temperatures.

There is, therefore, a need for the development of inventive surfactant formulations which have better tolerance to these factors. It is to these and other objectives that the present invention is directed.

SUMMARY OF THE INVENTION

In preferred embodiments, the present invention includes a foam generating surfactant formulation that includes a betaine, an alpha-olefin sulfonate and a microemulsion. The betaine is preferably a cocamidopropyl betaine or laurel betaine. The alpha-olefin sulfonate is preferably an anionic surfactant having between 8 and 18 carbon atoms per molecule. The microemulsion is preferably an oil-in-water microemulsion that includes an emulsifying surfactant, a solvent, a co-solvent and water. The addition of the microemulsion increases the thermal stability and salt resistance of the foam generating surfactant.

In another aspect, preferred embodiments include suitable methods of using the foam generating surfactant to produce a treatment foam in a well. The method begins with the step of mixing together a betaine, an alpha-olefin sulfonate and a microemulsion to form a foam generating surfactant formulation. The method continues with the step of pumping the foam generating surfactant formulation into the well. The process continues by forcing gas into the well to contact the foam generating surfactant formulation to produce the treatment foam.

BRIEF DESCRIPTION OF THE DRAWINGS

FIG. 1 provides a graph showing the results of a laboratory test of a preferred embodiment.

DETAILED DESCRIPTION OF PREFERRED EMBODIMENTS

The present invention relates to a surfactant formulation optimized for use in connection with a foam flooding tertiary recovery method. In preferred embodiments, the surfactant formulation includes three components: (1) an alpha olefin sulfonate (AOS) surfactant, (2) a betaine surfactant and (3) a suitable microemulsion. The addition of a microemulson to the AOS and betaine surfactants mitigates adsorption and provides additional salt and oil tolerance beyond that of the individual AOS and betaine components. This presents a significant improvement over prior art foam systems.

Betaine is used as a foam booster and a stable $CO_2$ foamer in fracturing at high temperatures. Suitable betaines include cocamidopropyl betaine and laurel betaine. Suitable cocamidopropyl betaines are commercially available from Rhodia under the Mackam OK50 trademark. Laurel betaine is particularly preferred because it is stable at high temperature and low pH and can generate $CO_2$ foam.

The AOS component is used to maintain and stabilize the foam. The AOS component is preferably an anionic surfactant, shorter chain alpha olefin sulfonate (e.g., C8-C12). In lower salinity environments, it may be possible to substitute the shorter chain alpha olefin sulfonate with a longer chain AOS (e.g., C12-18), which may exhibit improved foam generation properties. One preferred AOS component is Stepan's Stephantan AS 1246. It is believed that the combination of different types of surfactants synergistically exhibits better foaming properties than those of individual components.

If the betaine and AOS components are combined with a microemulsion, the microemulsion is preferably an oil-in-water microemulsion that includes an internal oil phase distributed within an external water phase through use of one or more surfactants. The internal oil phase is preferably a solvent selected from the class of solvents referred to as citrus terpenes, with d-limonene being a particularly preferred solvent. Suitable microemulsion surfactants include surfactants and surfactant mixtures having a hydrophile-lipophile balance (HLB) of between 8-20. Particularly preferred surfactants include mixtures of ethoxylated castor oils and ethoxylated alcohols. In a more particularly preferred embodiment, the selected surfactant or surfactant mixture has an HLB value of between 8 and 18.

In a particularly preferred embodiment, the surfactant component is an ethoxylated alcohol. In a more preferred embodiment, the surfactant component is an ethoxylated C8-C18 alcohol. In a still more preferred embodiment, the surfactant component is an ethoxylated C8-C18 alcohol with 5-20 moles of ethylene oxide (EO). In a particularly preferred embodiment, the surfactant component is an ethoxylated vegetable oil. In a more preferred embodiment, the surfactant component is an ethoxylated castor oil. In a still more preferred embodiment, the surfactant component is an ethoxylated castor oil with 25-45 moles of EO. U.S. Pat. No. 7,380,606 issued to Pursley, et. al on Jun. 3, 2008 entitled "Composition and Process for Well Cleaning," which is incorporated herein by reference, discloses several microemulsion formulations that may function as the microemulsion component of the $CO_2$ foam surfactant formulation. In certain applications, it may be desirable for the microemulsion component to include a mixture of different surfactants and surfactant packages.

The effectiveness of the preferred embodiments was evaluated against control foam generating systems using laboratory testing procedures. As a control, a foam generating surfactant mixture was prepared using AOS and betaine surfactants, but without the addition of a microemulsion component (Formulation 1). The control surfactant formulation included a mixture of AOS and betaine at about a 4 to 1 ratio.

For the preferred embodiments, the AOS and betaine surfactant mixture (formulation #1) was combined with a microemulsion component in varying amounts (Formulations #2, #3 and #4). The microemulsion component included an emulsifying surfactant, a solvent, a co-solvent and water. The control and test formulations are identified in Table 1 below:

TABLE 1

Test Formulations

| Formulation | 1 | 2 | 3 | 4 |
|---|---|---|---|---|
| AOS | 75.0% | 66.4% | 57.6% | 49.6% |
| Betaine | 25.0% | 16.6% | 14.4% | 12.4% |
| Emulsifying surf | 0% | 6.1% | 10.1% | 13.7% |
| Solvent | 0% | 3.7% | 6.2% | 8.4% |
| Cosolvent | 0% | 5.1% | 8.4% | 11.4% |
| Water | 0% | 2.0% | 3.4% | 4.6% |
| Total | 100.0% | 100.0% | 100.0% | 100.0% |

Formulations 2-4 represent examples of the preferred embodiments in which the AOS and Betaine are combined with increasing amounts of microemulsion ranging from 16.9% by weight (formulation #2) to 38.1% by weight (formulation #4). The AOS and betaine were mixed in a 4:1 weight ratio in each case.

The stability of the surfactant formulations was evaluated in brines to determine the resilience of the surfactant formulation under varying salinity (15% to 25%) and varying temperature (room temperature and 150° F.). The results of this study are presented in Table 2 below:

TABLE 2

Surfactant Solution phase behaviors at room temperature and 150° F. at varying salinity (CS - clear single phase; TP - two phase; LH - light hazy single phase)
Surfactant Concentration = 5 gpt

| Formulation | ME W% | 15% Salinity | | 20% Salinity | | 22.5% Salinity | | 25% Salinity | |
|---|---|---|---|---|---|---|---|---|---|
| | | RT | 150° F. | RT | 150° F. | RT | 150° F. | RT | 150° F. |
| #1 | 0 | CS | CS | CS | CS | TP | TP | TP | TP |
| #2 | 16.9 | CS | CS | CS | CS | LH | TP | LH | TP |
| #3 | 28.1 | CS | CS | CS | CS | LH | LH | LH | TP |
| #4 | 38.1 | CS | CS | CS | CS | LH | LH | LH | TP |

Phase stabilization tests have determined that the ratio of AOS to betaine in the control formulation (#1) provides the best tolerance to salinity. When used at typical or expected injection concentrations (e.g., 5 gallons per thousand gallons=gpt), this surfactant solution remains clear in up to 20% salinity at both room temperature (RT) and reservoir temperature (150° F.).

As noted in Table 2, the preferred embodiments of the surfactant formulation exhibit increased resistance to salinity over the control formulation. If 16.9 wt % microemulsion is added, the surfactant solution becomes light hazy at room temperature up to 25% salinity and phase separation is apparent at 150° F. The surfactant solution maintains a light hazy but homogenous single phase at up to 22.5% salinity with increasing microemulsion concentration to 28.1 wt % and 38.1 wt %. These solutions remained stable at 150° F. for more than 4 weeks.

The increased stability achieved through the addition of the microemulsion is believed to be the result of a reduction of the critical micelle concentration. Betaine has a lower critical micelle concentration than AOS. The critical micelle concentration of a mixture of AOS and betaine follows the mixture rule. Adding the microemulsion to the betaine/AOS mixtures further reduces the critical micelle concentration, which makes the formulation more efficient and stable.

In addition to an increased resistance to salinity, laboratory tests have also confirmed that the preferred surfactant formulations exhibit lower formation retention rates than isolated betaine. FIG. 1 presents a comparison of the retention/adsorption (mg/m2) of betaine against the surfactant formulations in 15% salinity at room temperature.

It has been found that isolated betaine surfactant shows a much higher retention in the subterranean formation than AOS and the mixture of betaine and AOS (formulation 1), and adding the microemulsion into the betaine and AOS surfactant mixture (formulations 2-4) further reduces the betaine adsorption. Formulation #2 is a complex system that includes anionic, amphoteric, nonionic surfactants and solvents. It is believed that the dispersed microemulsion complex provides an oil/water interface that is occupied by the various surfactants thus minimizing the free energy between the betaine and the formation and thus decreasing retention. This reduced retention of betaine helps generate foam faster and decreases the amount of betaine needed for successful $CO_2$ diversion.

Having established preferable retention and salinity properties, the performance of the novel surfactant formulations was evaluated using a series of four dual-core oil recovery tests. For the dual-core oil recovery tests, a pair of clean, dry cores was inserted into core holders. The cores were selected to have different permeabilities. The confining pressure was added to prevent any bypass. Each core was purged by $CO_2$ gas for 60 minutes in order to eliminate any air inside, then the core was saturated using formation brine (FB) and the absolute permeability was measured. Crude oil was then injected from the top of the core until no further water came out. The oil saturated core was aged for 15 hours at 150° F. $CO_2$ was co-injected at a certain ratio with FB or treatment chemicals at 10 ft/day. The same flow velocity (10 ft/day) was used for all of the tests.

Secondary production (from bottom to top) flooding was performed with brine to a residual oil saturation, followed by a $CO_2$—Formation Brine (FB) co-injection as tertiary flooding. The $CO_2$-surfactant solution was then co-injected and the apparent viscosity of $CO_2$ foam in the presence of oil was measured. The volume of oil recovered in different stages was recorded.

In a first control test, 2 gpt of betaine in 15% salinity was used as the treatment product. The flooding by FB alone and $CO_2$-FB (1:1) co-injection recovered 20.0% and 19.5% oil, respectively. $CO_2$ diversion flooding recovered an additional 12.5% oil. The use of betaine alone produced a total oil recovery of 52.0%.

In a second control test, 5 gpt of formulation #1 (AOS to Betaine ratio of 4:1 surfactant mixture) in 15% salinity was used as treatment. The flooding by FB alone and $CO_2$-FB (1:1) co-injection recovered 38.3% and 16.1% oil, respectively. $CO_2$ diversion flooding recovered an additional 24.3% oil. Using a first preferred embodiment of the inventive surfactant formulation produced a total oil recovery of 78.7%.

In a third test, 5 gpt of formulation #2 (betaine, AOS and microemulsion) in 15% salinity was used as the treatment surfactant formulation. The flooding by FB alone and $CO_2$-FB (1:1) co-injection recovered 27.0% and 30.0% oil, respectively. $CO_2$ diversion flooding recovered an additional 25.1% oil. Using a second preferred embodiment of the novel surfactant formulation produced a total oil recovery of 82.1%.

For the final test, 5 gpt of formulation #2 (betaine, AOS and microemulsion) in 15% salinity was used as the treatment surfactant formulation. The flooding by FB alone and $CO_2$-FB (1:1) co-injection recovered 41.2% and 26.1% oil, respectively. $CO_2$ diversion flooding recovered an additional 22.2% oil for a total oil recovery of 89.5%.

Tests 1, 2 and 3 were conducted under immiscible conditions. $CO_2$ is partially miscible with the crude oil and thus only a fraction of the oil is capable of being recovered. Test 4 was performed under miscible conditions.

It is believed that the flooding by formation brine (FB) alone and $CO_2$-FB co-injection for Test 1 is lower because the $CO_2$ foam was generated slowly due to the high adsorption of betaine and resulting low betaine concentration. The oil recovery from FB and $CO_2$-FB co-injection for Test 2 and Test 3 is similar because they were conducted under the same flooding conditions, such as back pressure, salinity, temperature, and core permeability. Notably, however, the oil recovery rate during the $CO_2$ foam flooding is different between these tests. It was observed that the microemulsion surfactant formulation used in Test 3 recovered oil within 2.5 pore volume (PV), whereas the surfactant formulation in test 2 took about 6 PV to get to the plateau. These results prove that the microemulsion formulation greatly enhanced the $CO_2$ foamer properties and thus improved the oil recovery rate.

During use, it is currently contemplated that the inventive surfactant formulations may be used in concentrations ranging from 2-50 gallons-per-thousand gallons of carrier fluid, but more concentrated or dilute applications are contemplated as within the scope of the present invention and may be necessary depending on the wellbore conditions and treatment parameters. Particularly preferred concentrations are between 2-5 gallons-per-thousand gallons of carrier fluid.

Although preferred embodiments have been disclosed in the context of $CO_2$ flooding, it will be appreciated that the novel surfactant formulations may also be used with other foam-inducing gases, including nitrogen, hydrocarbons, hydrocarbon/solvent, hydrogen sulfide and flue gases or a combination thereof. Additionally, the novel surfactant formulations may also be applied in water flooding and foam diversion applications.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the appended claims. For example, surfactant and surfactant mixture selections can be modified and changed to take into account varying reservoir conditions.

It is claimed:

1. A method of producing a treatment foam in a well, the method comprising the steps of:
    mixing together a betaine, an alpha-olefin sulfonate and a microemulsion to form a foam generating surfactant formulation;
    pumping the foam generating surfactant formulation into the well; and
    forcing gas into the well to contact the foam generating surfactant formulation to produce the treatment foam.

2. The method of claim 1, wherein the step of pumping the foam generating surfactant formulation further comprises adding the foam generating surfactant formulation to a carrier fluid that is pumped into the well.

3. The method of claim 2, wherein the foam generating surfactant formulation is added to the carrier fluid in a ratio of between about 2 and 5 gallons per thousand gallons of carrier fluid.

4. The method of claim 1, wherein the step of forcing gas into the well further comprises forcing into the well a gas selected from the group consisting of nitrogen, hydrocarbon gases, hydrocarbon/solvent gas mixtures, hydrogen sulfide and flue gases or combinations thereof.

5. The method of claim 1, wherein the betaine is selected from the group consisting of cocamidopropyl betaine and laurel betaine.

6. The method of claim 1, wherein the alpha-olefin sulfonate is an anionic surfactant having between 8 and 18 carbon atoms per molecule.

7. The method of claim 6, wherein the alpha-olefin sulfonate has between 8 and 12 carbon atoms.

8. The method of claim 1, wherein the formulation includes about 1 part betaine to between about 2 and 5 parts alpha-olefin sulfonate.

9. The method of claim 8, wherein the formulation includes about 1 part betaine to about 3.4 parts alpha-olefin sulfonate.

10. The method of claim 1, wherein the microemulsion comprises an oil-in-water microemulsion.

11. The method of claim 1, wherein the microemulsion comprises:
    an emulsifying surfactant;
    a solvent,
    a co-solvent; and
    water.

12. The method of claim 11, wherein the solvent is a citrus terpenes.

13. The method of claim 12, wherein the solvent is d-limonene.

14. The method of claim 11, wherein the emulsifying surfactant comprises a mixture of ethoxylated castor oils and ethoxylated alcohols.

15. The method of claim 11, wherein the emulsifying surfactant has a hydrophile-lipophile balance value of between 8 and 18.

16. The method of claim 11, wherein the emulsifying surfactant is selected from the group consisting of ethoxylated alcohol and ethoxylated vegetable oil.

17. The method of claim 1, wherein the foam generating surfactant formulation comprises:
- between about 5 and about 70 percent by weight alpha-olefin sulfonate;
- between about 10 and about 20 percent by weight betaine;
- between about 5 and about 15 percent by weight emulsifying surfactant;
- between about 3 and about 10 percent by weight solvent,
- between about 3 and about 15 percent by weight co-solvent; and
- greater than about 0 to about 10 percent by weight water.

* * * * *